Oct. 16, 1962 H. G. BROOKS 3,058,251
FISHING ROD HOLDER AND SIGNALLING MEANS
Filed May 9, 1961
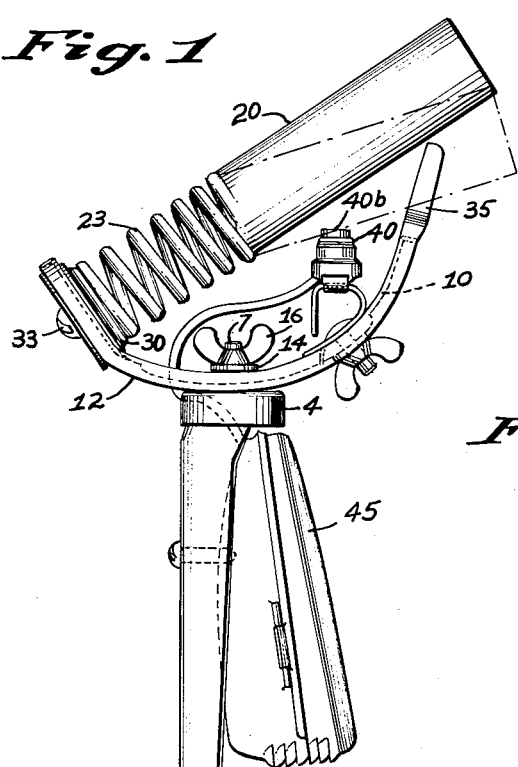
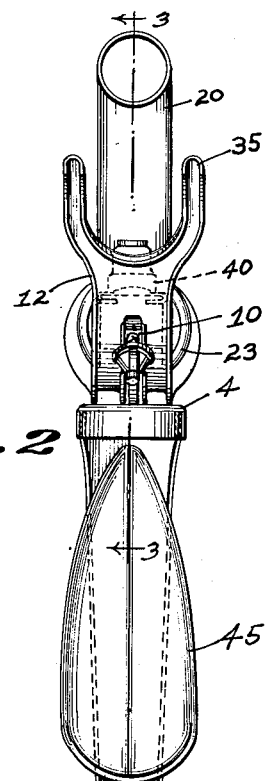
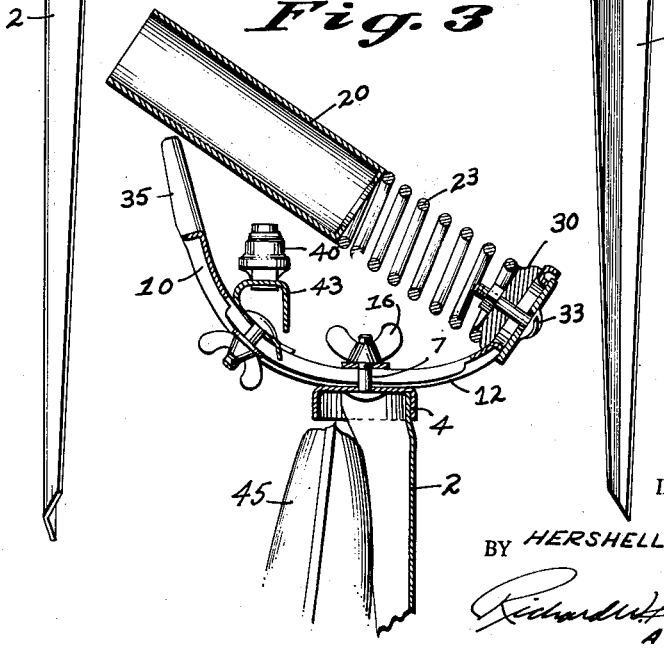
INVENTOR.
BY HERSHELL G. BROOKS
ATTORNEY United States Patent Office 3,058,251
Patented Oct. 16, 1962

3,058,251
FISHING ROD HOLDER AND SIGNALLING MEANS
Hershell G. Brooks, 1013 W. 16th St., Pueblo, Colo.
Filed May 9, 1961, Ser. No. 108,954
3 Claims. (Cl. 43—17)

This invention relates generally to fishing apparatus and specifically to improvements in a fishing rod holder adapted to provide a visual or audio signal to the fisherman upon the striking of the lure or bait by a fish.

The primary object of the present invention is the provision of a novel mounting for a fishing rod holder to facilitate construction thereof and to improve the adaptability of the device to various fishing conditions.

Briefly, the improved structure comprises a means for grasping and holding a fishing rod, which means is carried by a semi-circular cradle rotatable in both the horizontal and vertical planes. In addition to supporting the rod holder means, the cradle slidably mounts a switch which cooperates with the rod holder to actuate a signalling device upon the downward movement of the holder means.

For a more detailed explanation of the preferred embodiment of the invention reference is made to the accompanying drawings in which:

FIGURE 1 is a side elevational view of the fishing rod holder and signalling horn.

FIGURE 2 is a front elevational view of the fishing rod holder of the present invention.

FIGURE 3 is a cross sectional view taken along lines 3—3 in FIGURE 2.

The fishing rod holder of the present invention comprises a support member 2 which may be of several different varieties depending on the use for which it is intended. For example, the support member may be an elongated stake adapted to be pushed into the ground, or it may take the form of a C clamp to be fastened to the transom of a boat or to a wharf. The preferred embodiment is the stake which is shown in the drawings.

Welded, or fastened by other convenient means, to the topmost portion of the support member is a flat platform 4 having a centrally disposed opening therein and in which is received a threaded bolt 7 or other type of fastener. The threaded portion of the bolt protrudes upwardly through the opening in the platform and into an elongated slot 10 formed lengthwise of an arcuately shaped cradle 12. A washer 14 and abutting wing nut 16 threaded onto the platform bolt 7 secure the arcuate cradle 12 onto the platform.

The aforementioned arcuate cradle is approximately semi-circular in shape and is provided at one end thereof with means for attaching the rod holder assembly. The preferred form of the rod holder includes a tubular sleeve 20, into which the extremity of a fishing rod handle may be inserted, the sleeve being axially aligned with and secured to one end of a spiral spring 23. The other end of the spiral spring is attached, by any convenient means, to the arcuate cradle 12. As illustrated in the drawings, one convenient method of attaching the spring to the cradle is provided by welding the end coil of the spiral spring 23 to the face of a washer or disc plate 30 which is tightly maintained by a fastener 33 against a flattened end portion of the cradle.

The other end of the cradle is forked to form a bifurcated support guide 35 for the rod holder sleeve 20. Since the rod holder sleeve and arcuate supporting cradle lie in the same plane, the weight of the supported fishing rod and tackle will deform the spiral spring 23 which mounts the rod holder sleeve, thus allowing the sleeve to sink into the space between the two forks of the guide 35. Lateral movement of the rod holder sleeve will be limited by the guide forks and the curved inner camming surface of the guide will tend to redirect lateral forces exerted on the sleeve and rod, changing the direction of movement to a substantially downward one.

Downward motion of the rod holder sleeve is necessary to actuate the electric switch 40 which is slidably carried by the said cradle and which activates the signalling mechanism 45. The switch is normally open and is closed by the depression of a push button 40b located beneath the rod holder sleeve. To increase the flexibility of adjustment of the device, the switch is supported by a thin rigid base member 43 which is slidably and adjustably mounted in the lengthwise slot 10 of the arcuate cradle. The slot defines a track along which the switch base member may be moved to change the distance between the rod holder sleeve and the push button forming part of the switch, thereby providing a means for adjusting the sensitivity of the signalling device. The signalling device itself is preferably a battery operated horn, attached conveniently to the support member and which is sounded upon the closing of the switch contacts. The circuitry of the signalling device is well known and is therefore not illustrated, however, it may be said that other forms of signalling devices may be employed such as lights, or both horns and lights.

In operation, the support member is stuck into the ground adjacent a body of water to be fished. The fishing pole is inserted into the tubular rod holder sleeve, which is adjusted for the desired elevational angle of the fishing rod by tilting the cradle 12. Once the desired angle is obtained, the wing nut 16 holding the cradle onto the support platform 4 is tightened to maintain the cradle in the desired position. The sensitivity of the signalling device is set according to wind and water conditions by seating the movably mounted switch the proper distance away from the rod holder sleeve. A strike by a fish will cause the fishing rod and its spring supported holding sleeve to deflect a sufficient distance and close the switch, thus signalling the fisherman that his bait or lure has been taken by a fish.

What I claim as new and desire to have protected by Letters Patent is:

1. A self-signalling fishing rod holder, comprising in combination;
   a support member;
   a flat platform secured to the support member;
   an arcuately contoured cradle member having a track defining slot therein and extending lengthwise thereof;
   pin means carried by the platform and disposed in said track defining slot radially to the arcuate cradle member;
   fastening means attached to the pin means and adapted to cooperate therewith to detachably secure the cradle member to the platform at one point along the arcuate length of the said cradle member;
   a fishing rod holder carried by the cradle member, said holder including;
   a spiral spring attached at its one end to the cradle member;
   a tubular sleeve axially aligned with and secured to the other end of the spiral spring;
   switch means slidably mounted in the track defining slot of said cradle member, and underlying the tubular sleeve; and
   signalling means attached to the support member and electrically interconnected to the said switch means whereby when a fish is caught and the fishing rod is pulled downwardly the sleeve will be moved into engagement with the switch means to actuate the signalling means.

2. The fishing rod holder as defined in claim 1, and further comprising;
a bifurcated guide member integral with one end of the cradle member and sized and adapted to receive the said tubular sleeve.

3. A self-signalling fishing rod holder comprising in combination;
a support member;
a mounting platform carried by the support member;
a fishing rod holder;
means mounting the said fishing rod holder, said means adjustably secured to the mounting platform for rotation about a horizontal and vertical axis, the said means including a spiral spring at one end of which is attached the fishing rod holder; and
signalling means including;
an electrically operated signal attached to the support member;
a switch operably connected to the signal and slidably mounted on the mounting means for the fishing rod holder.

References Cited in the file of this patent
UNITED STATES PATENTS

| | | |
|---|---|---|
| D. 136,856 | Clowecki | Dec. 14, 1943 |
| 2,302,337 | Mantell | Nov. 17, 1942 |
| 2,704,411 | Carroll | Mar. 22, 1953 |
| 2,745,088 | Bauer | May 8, 1956 |
| 2,816,388 | Hartley | Dec. 17, 1957 |
| 2,961,209 | Willey | Nov. 22, 1960 |